United States Patent [19]

Endoh

[11] Patent Number: 5,101,394
[45] Date of Patent: Mar. 31, 1992

[54] DATA REPRODUCING APPARATUS

[75] Inventor: Naoki Endoh, Tokyo, Japan

[73] Assignee: Kabushiki Kaisha Toshiba, Kawasaki, Japan

[21] Appl. No.: 329,673

[22] Filed: Mar. 28, 1989

[30] Foreign Application Priority Data

Mar. 28, 1988 [JP] Japan .................................. 63-73797

[51] Int. Cl.$^5$ .............................................. G11B 20/10
[52] U.S. Cl. ..................................... 369/59; 360/19.1; 360/36.2
[58] Field of Search ......................... 360/32, 26.1, 37.1, 360/36.2, 9.1; 358/160, 167, 320, 335, 339; 364/900; 369/59, 124

[56] References Cited

U.S. PATENT DOCUMENTS

| 4,077,046 | 2/1978 | Morio | 358/328 X |
| 4,091,418 | 5/1978 | Ciciora | 358/160 X |
| 4,334,249 | 6/1982 | Yokoyama | 360/30 X |
| 4,378,593 | 3/1983 | Yamamoto | 364/900 X |
| 4,413,288 | 11/1983 | Hurst | 360/31 X |
| 4,437,125 | 3/1984 | Yamamoto | 358/167 X |
| 4,636,837 | 1/1987 | Sato | 358/320 X |
| 4,742,546 | 5/1988 | Nishimura | 380/35 X |
| 4,780,769 | 10/1988 | Numakura et al. | 358/320 X |

OTHER PUBLICATIONS

"Data Transmission", W. R. Bennett and J. R. Davey, 1965, Chapter 14.

Primary Examiner—Donald McElheny, Jr.
Attorney, Agent, or Firm—Oblon, Spivak, McClelland, Maier & Neustadt

[57] ABSTRACT

The invention relates to a reproducing apparatus for reproducing digital signals. The apparatus comprises means for detecting the recorded data from the medium and generating digital data signals corresponding of the recorded data having a first predetermined bit rate, expansion means for converting the digital data signals from the detecting means into expanded digital signals having a second bit rate lower than the first bit rate, and means coupled to the expanding means for extracting the portions of the expanded digital signals corresponding to the synchronous words. Thus, it can be to provide a compact magnetic recording and reproducing apparatus which is more reliable, and less costly to manufacture, utilizing a lower working speed synchronous detector.

7 Claims, 9 Drawing Sheets

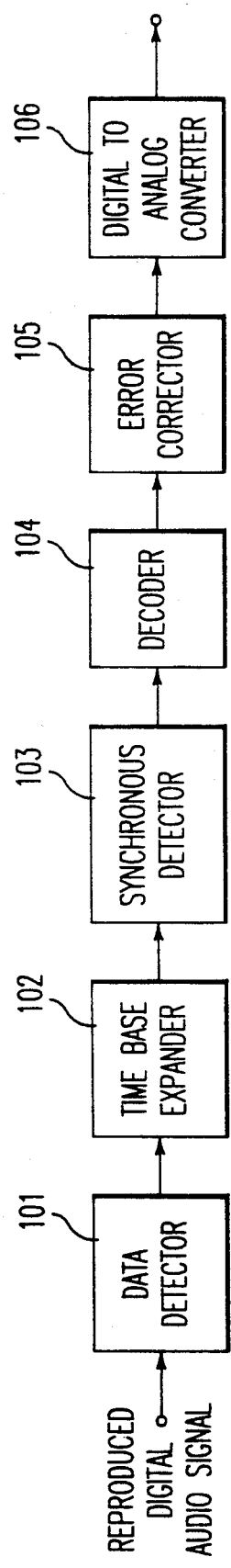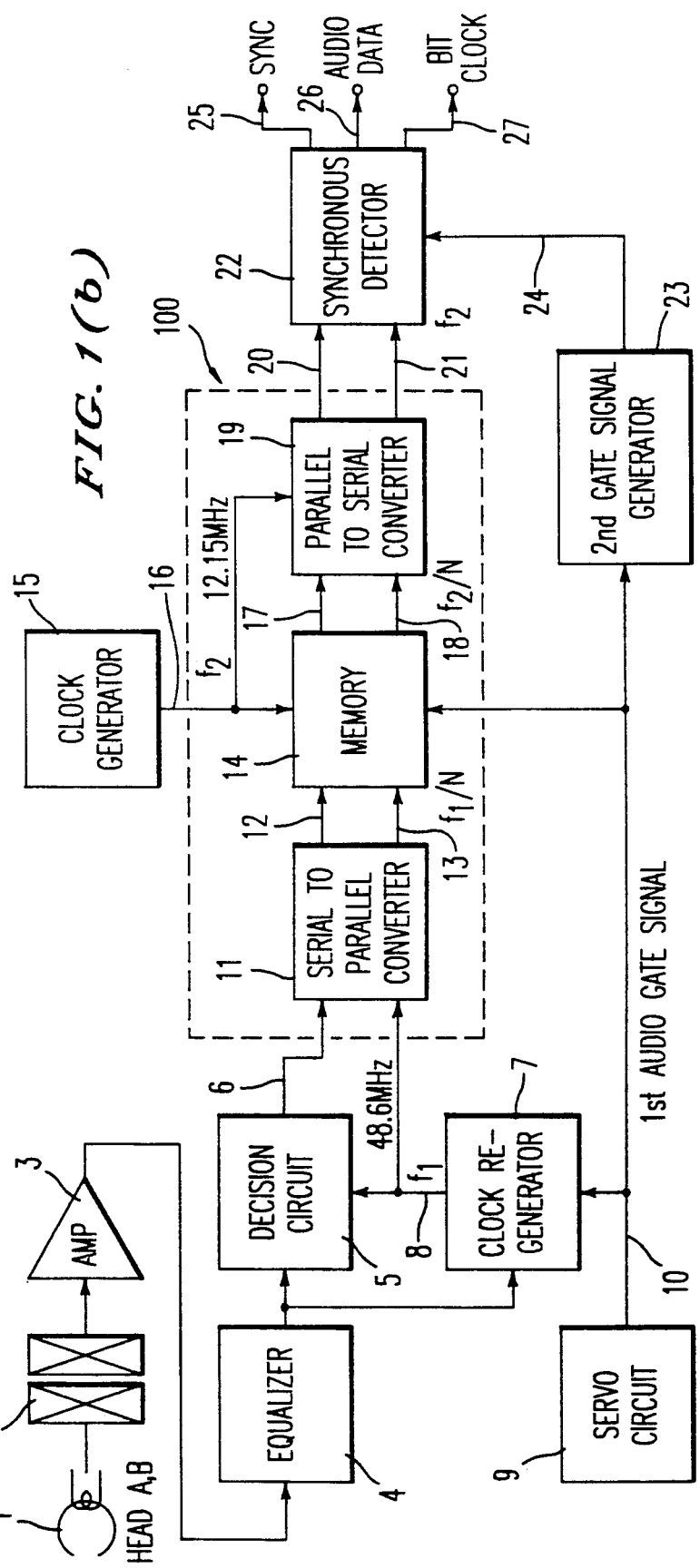
FIG. 1(a)
FIG. 1(b)

DATA REPRODUCING APPARATUS

BACKGROUND OF THE INVENTION

The present invention relates to a magnetic recording and reproducing apparatus, particularly for recording and reproducing video signals and audio signals on helical tracks with a rotary magnetic head.

Rotary head type VCRs include arrangements for recording and reproducing video signals and audio signals to/from tracks of magnetic tape. An example of a typical tape format is shown in FIG. 2. Video tracks 34 for recording video signals and audio tracks 35 for recording digital audio signals, both forming helical tracks 33, are provided on a magnetic tape 30 which normally travels in the direction of an arrow 31.

A rotary magnetic head scans tracks 33 in the direction indicated by an arrow 32. TCI (Time Compressed Integration) signals are recorded as video signals on the video track 34, and PCM (Pulse Code Modulation) signals are recorded as digital audio signals on the audio tracks 35. To record the digital audio signals, original input analog audio signals are first digitalized (PCM). The PCM signals are process interleaved, and error correction words are inserted. The resulting signals are modulated, and synchronous words are inserted. Then after these processes, the audio signals are recorded on the audio track 35 of the magnetic tape 30.

FIG. 9 shows a block diagram of a conventional reproducing apparatus for reproducing digital audio signals. Signals on the audio tracks are sensed by a magnetic head 1 and are supplied to an amplifier 3 through a rotary transformer 2. The frequency characteristics of the amplified signals from magnetic head 1 through the magnetic tape are compensated by an equalizer 4, and the reproduced signals are detected by a decision circuit 5 responsive to a bit clock signal $f_1$ supplied from a clock regenerator 7. This bit clock signal $f_1$ is generated using the output signal of the equalizer 4 and a gate signal 10 of a servo circuit 9. After these processes the reproduced audio signals are input to a synchronous circuit 22. To establish synchronization, the synchronous circuit 22 detects the inserted synchronous words recorded on the audio tracks and cancels undesired synchronous words which are generated by bit errors. Finally, the digital audio signals are separated into the synchronous words, audio data and bit clock signals.

During operation of any VCR apparatus, the magnetic head (recording head, reproducing head) becomes worn. With the prior art apparatus, this reduces the interchangeability with other VCR apparatus, because it causes equalizing errors. As a result, the bit clock signal $f_1$ regenerated by the clock regenerator 7 experiences time base errors called "jitter", which cause errors or problems in the operation of the apparatus.

Moreover in detecting signals from the decision circuit 5, the synchronous circuit 22 driven by a high frequency (48.6 MHz), such as an ECL (Emittor-Coupled Logic) device, is used. However an ECL device dissipates a large amount of power when the bit rate of the digital audio signals is more than about 50 Mbps (bit per second). Due to the high driving frequency, a CMOS (Complementary Metal-Oxide Semiconductor) IC that operates at a low speed, and is lower in cost, cannot be used.

SUMMARY OF THE INVENTION

It is one object of this invention to overcome the foregoing problems of the prior art, and thus to provide a compact magnetic recording and reproducing apparatus which is more reliable, and less costly to manufacture, utilizing a lower working speed synchronous detector.

According to this invention, the foregoing object is attained by including a time base expansion circuit. Time base expansion refers to converting reproduced data of high bit rate to reproduced data of low bit rate. The time base expansion circuit converts the high bit rate (e.g. 48.6 MHz) of reproduced data to a lower bit rate (e.g. 12.15 MHz) before supplying it to the synchronous detector. By using a time base expansion circuit the skew of the reproduced data signal can be reduced, and the jitter of bit clock signal $f_1$ can be restrained by control of the phase relation between the reproduced data signal and bit clock signal $f_1$. In addition, synchronous detector having a lower speed as compared with the bit rate of the recorded digital signal can be used. This is because the reproduced digital audio signals recorded on a part of the helical tracks are input to the synchronous detector only after the digital audio signals are time base expanded. Consequently, it is possible to use a low power IC, such as a CMOS IC, instead of a high power IC for the synchronous detector. Further, since the rate of time base expansion can be matched to a recording format and a process time for correcting errors etc., more design flexibility is achieved.

BRIEF DESCRIPTION OF THE DRAWINGS

FIG. 1(a) is a block diagram of the preferred embodiment of this invention,

FIG. 1(b) is a detailed block diagram of the preferred embodiment of this invention.

DETAILED DESCRIPTION OF THE PREFERRED EMBODIMENTS

Figure 2:
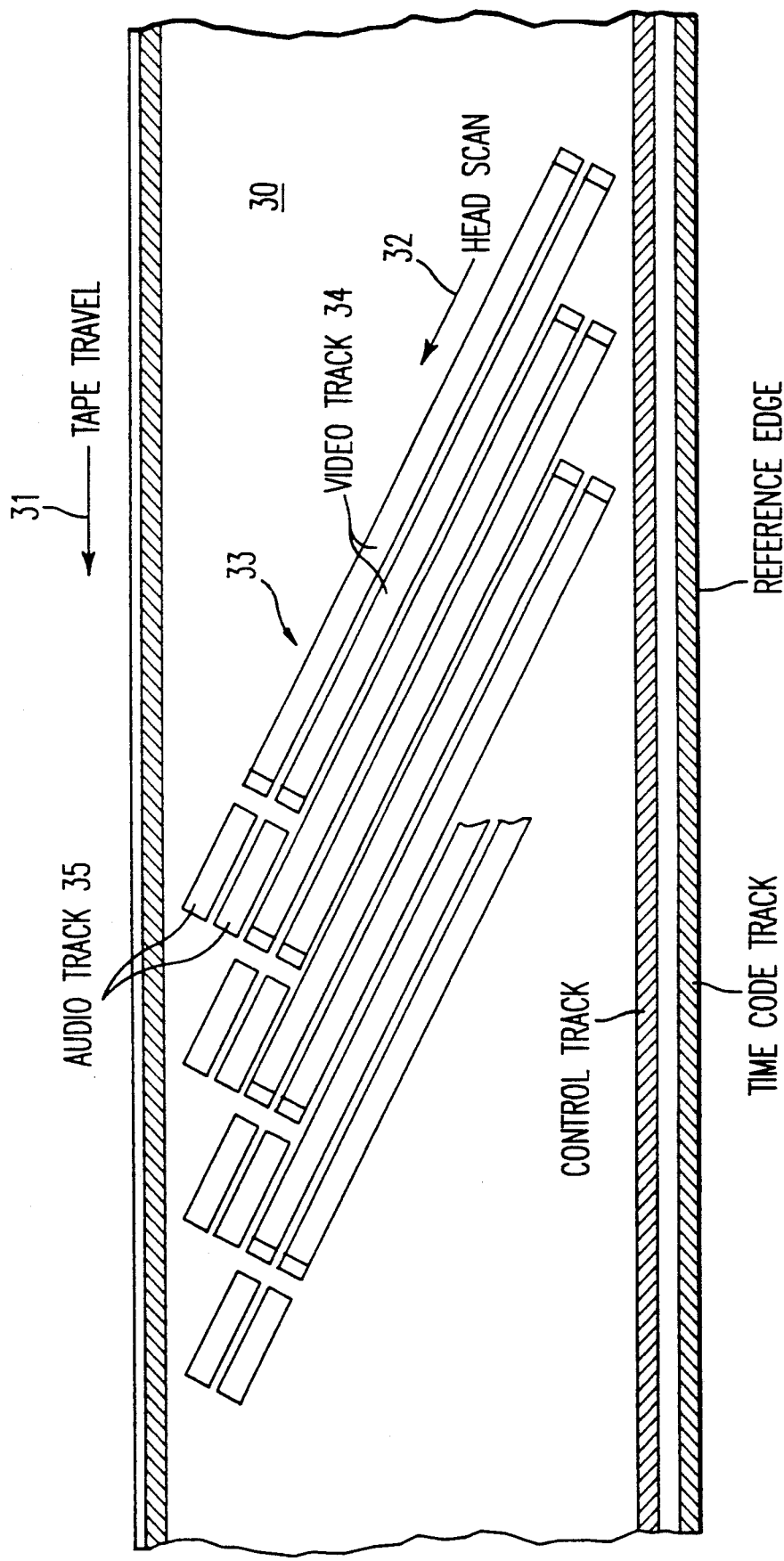
FIG. 2 shows an example of a typical pattern of audio and video tracks recorded on a magnetic tape.
Figure 3:
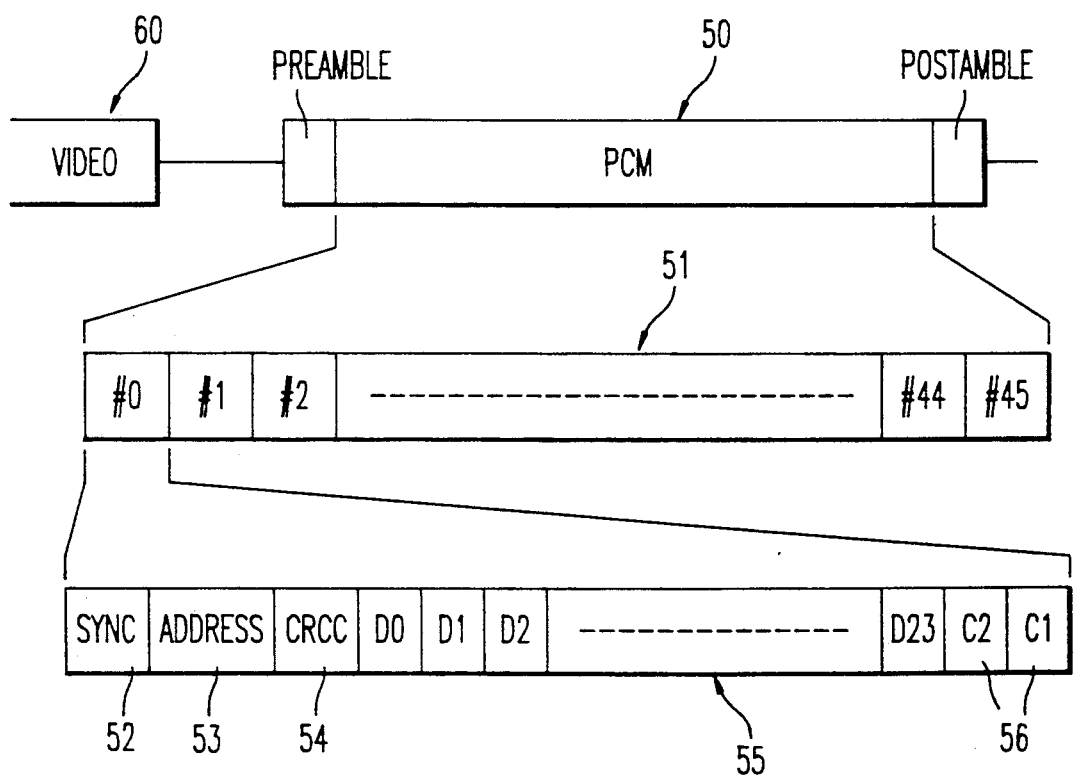
FIG. 3 is a schematic diagram explanatory of the content of the audio signals (PCM)

At first, we will explain, with particular reference to FIG. 3, the signals, and formats etc., which are shown in the above FIG. 2, recorded on the audio tracks and video tracks (including a preamble and a postamble part, which are predetermined mono-signals).

FIG. 3 shows a format of PCM audio signals 50 on one audio track. This one audio track 51 is divided into 46 blocks (#0–#45). Each block includes a synchronous signal (SYNC) 52, a address signal 53, a cyclic redundancy check character signal (CRCC) 54, blocked data ($D_0, \ldots, D_{23}$) 55 and two error correct signals (C1, C2).

The CRCC 54 is used to detect errors of the address signal 53.

Figure 4A:
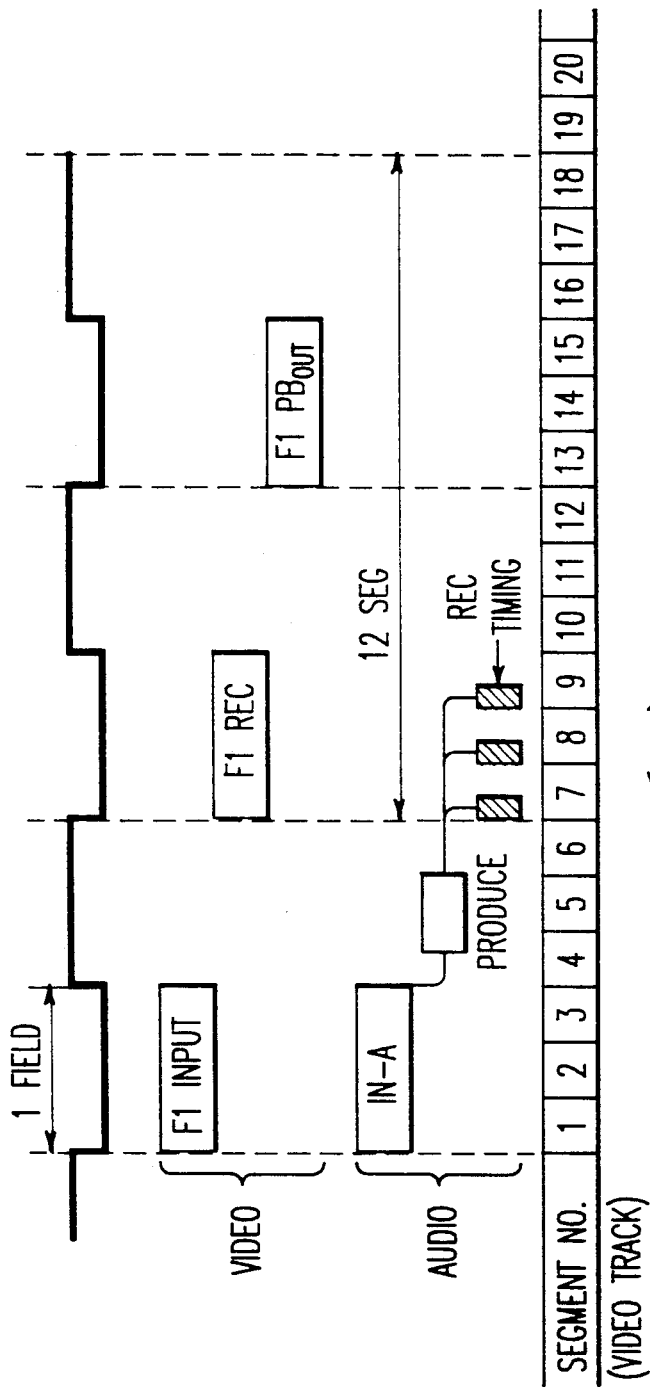
FIG. 4(a) is a schematic diagram explanatory of the recording timing of the audio and video signals.
Figure 4B:
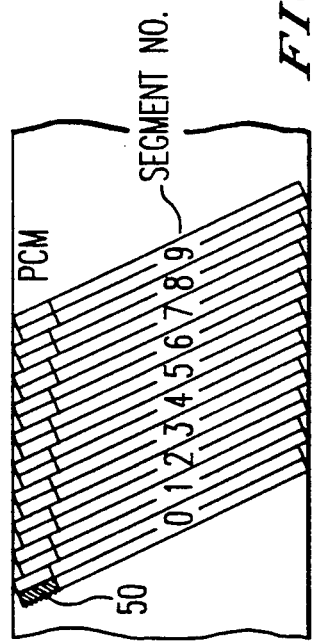
FIG. 4(b) shows an example of segment numbers corresponding to the audio and video tracks, FIGS. 5(a) and (b) are a cross sectional plan view and a side view of the rotary head drum, respectively.

Recording timing of the above PCM audio signal 50 will be explained with FIGS. 4(a) and 4(b). One segment (number), as shown in FIGS. 4(a) and 4(b), is made of two tracks and a PCM audio signal of one track is as shown above in FIG. 3. Namely, the numeral 50 in FIG. 4(b) corresponds to the PCM audio signal shown in FIG. 3. For recording of PCM audio signals, original audio signals (IN-A) are sampled at 48.6 MHz and encoded by PCM. Then the audio signals are divided into individual field units. Moreover, the divided audio signals are divided in to three segment. Each block of a segment includes, as described above, a synchronous signal, an address signal, a CRCC signal, block data and error correct words recorded on the tape. In FIG. 4(a), the original audio signal (IN-A) corresponding to the video signal F1 at the time during scanning of segments number 1, 2, 3, is delayed by one frame period and recorded at the time of segment numbers 6, 7, and 8.

Figure 6:
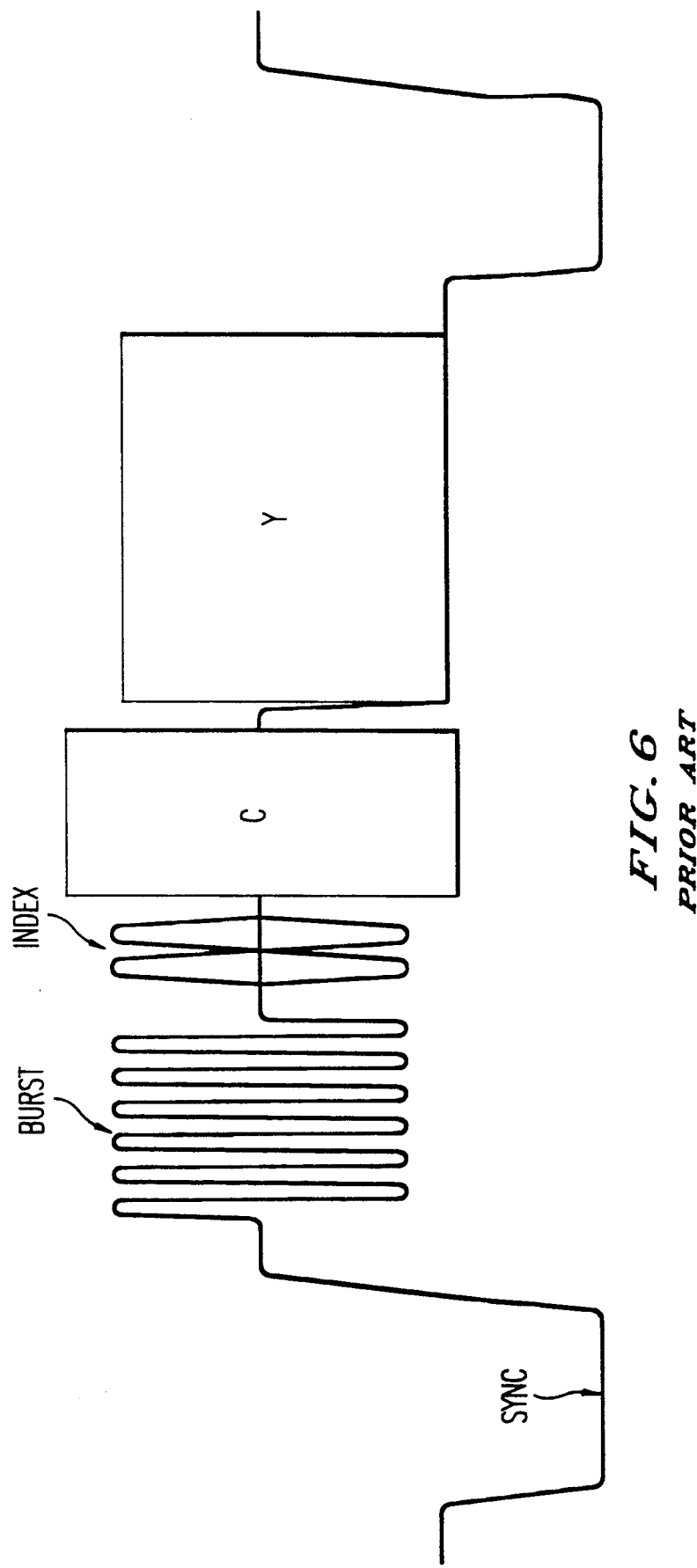
FIG. 6 shows the wave form of video signals (TCI)

Video signals (VIDEO 60) as shown in FIG. 3, is processed with TCI (Time Compressed Integration), shuffling in one field and conversion of one field to three segments. The components of the input video signal are R (red), G (Green), B (blue) or Y (luminance) signals, $C_w$, $C_n$ (chrominance signals), etc. These video signals are, for example, the signals shown in FIG. 6, which is a TCI waveform. This waveform includes a synchronous signal (SYNC), a burst signal, a segment index signal, a chrominance signal ($C_w$ or $C_n$), a Y signal, etc. One field's video signals (F1 INPUT) which are input during scanning segment numbers 1, 2, 3, as shown in FIG. 4(a), are delayed one frame and recorded on the tracks correspond to segment numbers 7, 8, 9 on the tape. At almost the same time, the signals are reproduced and monitored ($PB_{out}$).

Figure 5A:
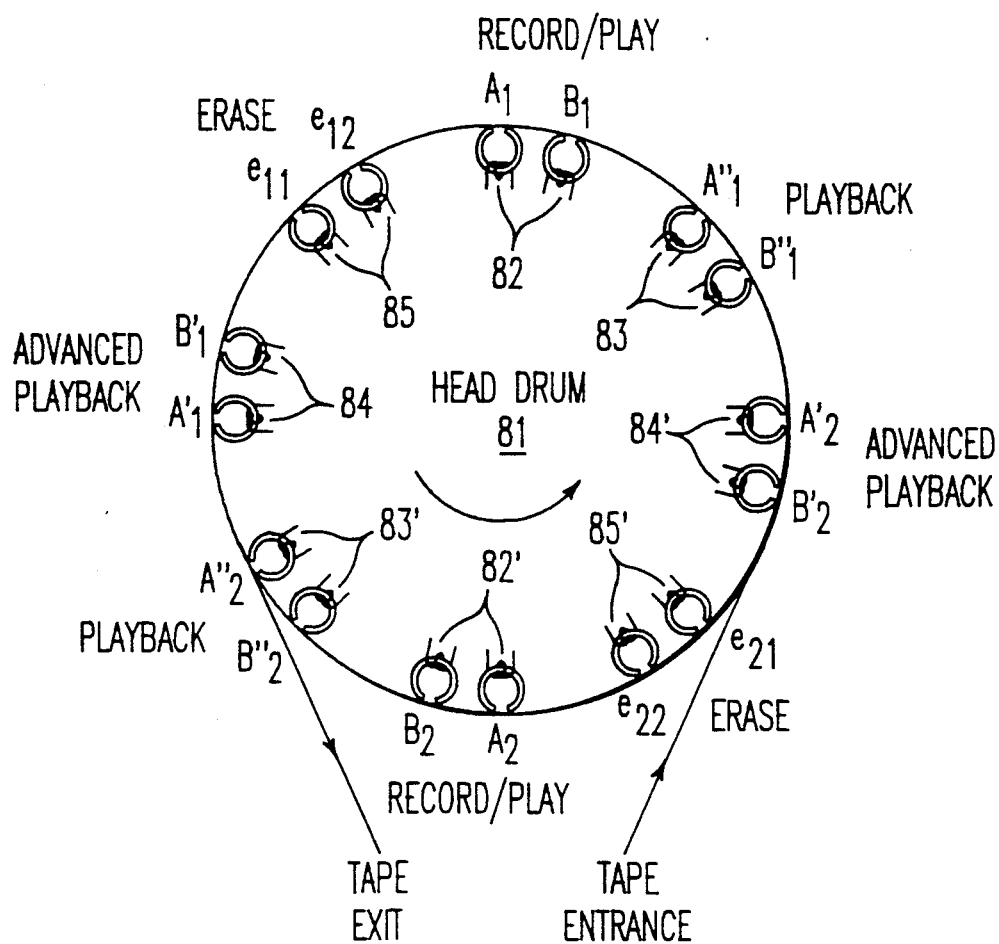
Figure 5B:
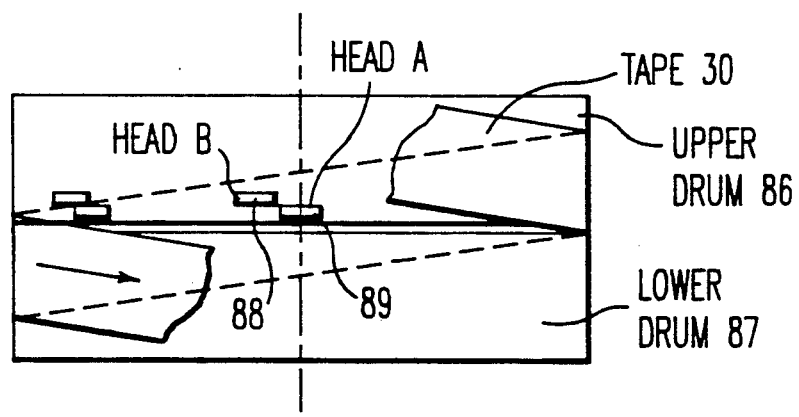

The magnetic head (included the rotary head drum) which scans about above tracks will be explained below. FIG. 5(a) shows a cross sectional plan view of the magnetic heads, and FIG. 5(b) shows a cross sectional side view.

The rotary head drum includes an upper drum 86 and a lower drum 87. The upper drum 86 accommodates a pair of Record and Play (reproduce) heads $A_1B_1$ 82, $A_2B_2$ 82', Play-back heads $A_1''B_1''$ 83, $A_2''B_2''$ 83', Erase heads $e_{11}e_{12}$ 85, $e_{21}e_{22}$ 85' and Advanced Playback heads (to reproduce in front of Erase heads) $A_1'B_1'$ 84, $A_2'B_2'$ 84'. Another pair of heads which has same function is arranged at the opposite position. The Record and Play head has a function to record and reproduce video signals and audio signals. The Play-back head has a function to monitor the recording condition. The Advanced Play-back head is used in the editing mode and has a function to reproduce signals from a magnetic tape in advance of the Erase head. Also each of a pair of heads 88, 89, which scan a track of one segment, for example Play-back head $A_1''B_2''$, is shifted 0.023 mm radially away from the center of the rotary head drum, as shown FIG. 5(b).

The digital audio signals are reproduced by the reproducing system according to the preferred embodiment of the invention, as shown in FIGS. 1(a) and 1(b). First, the reproduced digital audio signals are detected by a data detector 101. Then, before detecting the synchronous signal, the detected audio signals are time base expanded by a time base expander 102. After this processing, the synchronous signal of the audio signal (PCM) is detected by a synchronous detector 103 and decoded by a decoder 104. After this processing, the audio signal is processed for error correction as usual in prior art and is time base compensated by an error corrector 105. The resulting signal is converted to an analog signal by a digital to analog converter 106.

FIG. 1(b) is a block diagram which explains FIG. 1(a) in more detail. In FIG. 1(b), the audio signals on the magnetic tape, which is reproduced by rotary magnetic head (A, B) 1, are input to an amplifier 3 via rotary transformer 2. Output signals from the amplifier 3 are input to an equalizer 4 and any difference of frequency characteristic between the recorded and reproduced signals is compensated. Output signals from the equalizer 4 are digitalized, and arranged in a waveform, and the first reproduced data 6 is generated by the decision circuit 5.

Output signals from equalizer 4 are also input to a clock regenerator 7, and a first bit clock signal $f_1$ 8 is generated. A servo circuit 9 generates a first audio gate signal, which shows the period that the digital audio signal is existing. The clock regenerator 7 generates the first bit clock signal $f_1$ corresponding to the output signal from the equalizer 4 within the period of the first audio gate signal. This first bit clock signal $f_1$ is supplied to the decision circuit 5 and used to arrange the waveform. The above described circuits correspond to the data detector (101 in FIG. 1(a)).

Figure 7:
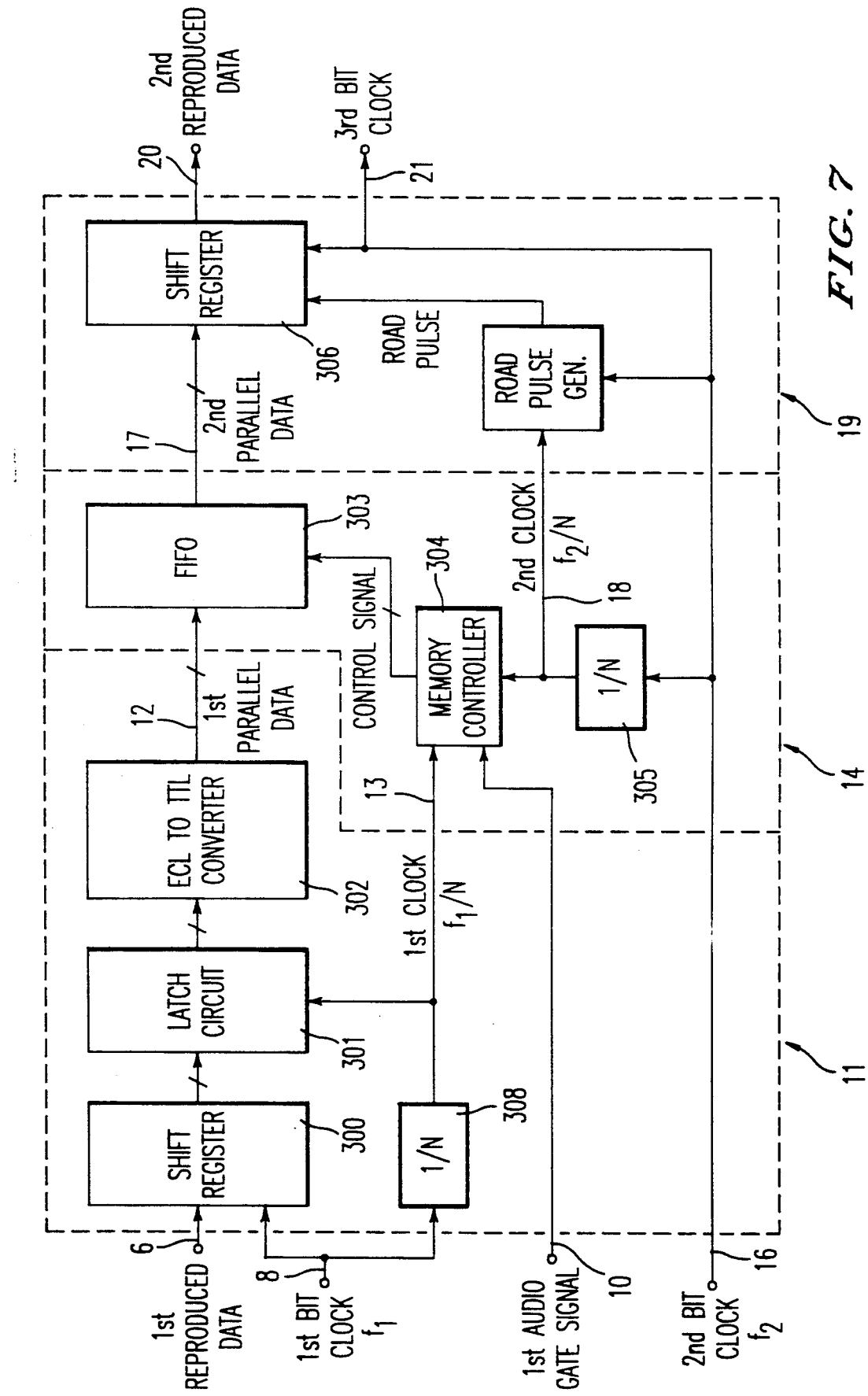
FIG. 7 is a detailed block diagram of the time base expander.

The first reproduced data 6 from the decision circuit 5 is input to a time base expander 102. This circuit includes a serial to parallel converter 11, a memory 14 and a parallel to serial converter 19. This serial to parallel converter 11 is, for instance, as shown in FIG. 7, constructed by an n step shift register 300 and an n bit latch circuit 301, which latches the parallel output signal, an ECL to TTL (Transistor Transistor Logic) converter 302 and a 1/N frequency-divider 308. Also, it is operated by the first bit clock signal 8 of frequency $f_1$ ($f_2 < f_1$) supplied from the clock regenerator 7 and converted the first reproduced data 6 (serial data) to first parallel data 12 by n parallel bits, where each bit has an $f_1/N$ (bps; bit per second) bit rate. Moreover, the serial to parallel converter 11 simultaneously generates the first clock signal 13 of frequency $f_1/N$. A fast shift register operated at $f_1$ is needed, but the circuit scale of this is smaller than that of a synchronous detector 22 (described hereinafter).

The memory 14 is input with the first parallel data 12 and the first clock signal 13 from the serial to parallel converter 11. This memory 14 is, for example, as shown in FIG. 7, constructed by FIFO (First-In First-Out) Memory 303, a memory controller 304 and a 1/N frequency-divider 305, and memorizes the first parallel data 12 by FIFO's control signal (address) from the memory controller 304. This is determined by the first clock signal $f_1/N$ 13 and the first audio gate signal 10 during the period of the first audio gate signal 10. Namely, the memory 14, having a comparatively low access speed, can be used.

The second bit clock ($f_2$) generated by a clock generator 15 is supplied to the memory 14. A second parallel data 17 from FIFO 303 (of the memory 14), is read out during a period when the data 12 is not memorized into the FIFO 303. An address for reading out from FIFO 303 changes corresponding to the speed of $f_2/N$ 18, which the second bit clock $f_2$ is divided into 1/N frequency by a 1/N frequency-divider 305. It is output the second clock 18, so $f_2/N$ from the 1/N frequency-divider 305 of memory 14.

The second parallel data 17 and the second clock $f_2/N$ 18 are supplied to the parallel to serial converter 19. This circuit, for example, as shown in FIG. 7, includes an n step shift register 306. This shift register 306 generates a second reproduced data 20 which has bit rate of $f_2$ (bps) and a third bit clock ($f_2$) 21 by the input timing of the second bit clock ($f_2$) 16. The second reproduced data 20 and the second bit clock 21 are input to the synchronous detector 22.

Also, to the synchronous detector 22, the second reproduced gate signal 24 from the second gate signal generator 23 corresponds to the existing period of the digital audio signals to the second reproduced data 20. The signals 24 is referred to the first gate signal. The synchronous detector 22 has an operation that cancels "unexpected synchronous words" caused by bit error, detects the real synchronous words inserted during the recording mode and outputs the predetermined synchronous word, audio data and bit clock at each of three terminals 25, 26, 27. Namely, the bit rate for the time base expansion can be determined from the period which the magnetic head is reproducing the video signal by controlling the second bit clock $f_2$ from the clock generator 15.

Figure 8:
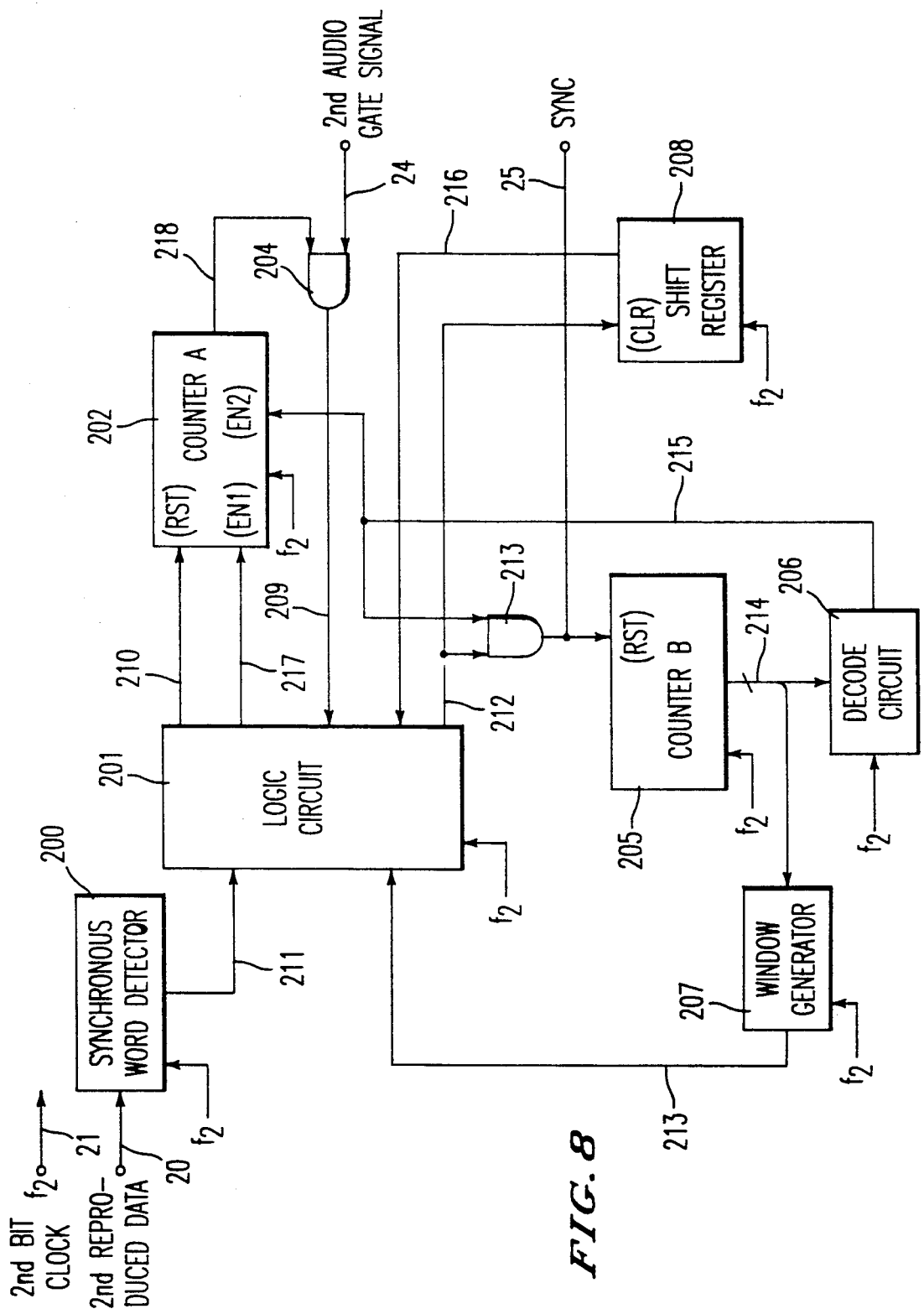
FIG. 8 is a detailed block diagram of the synchronous detector.
Figure 9:
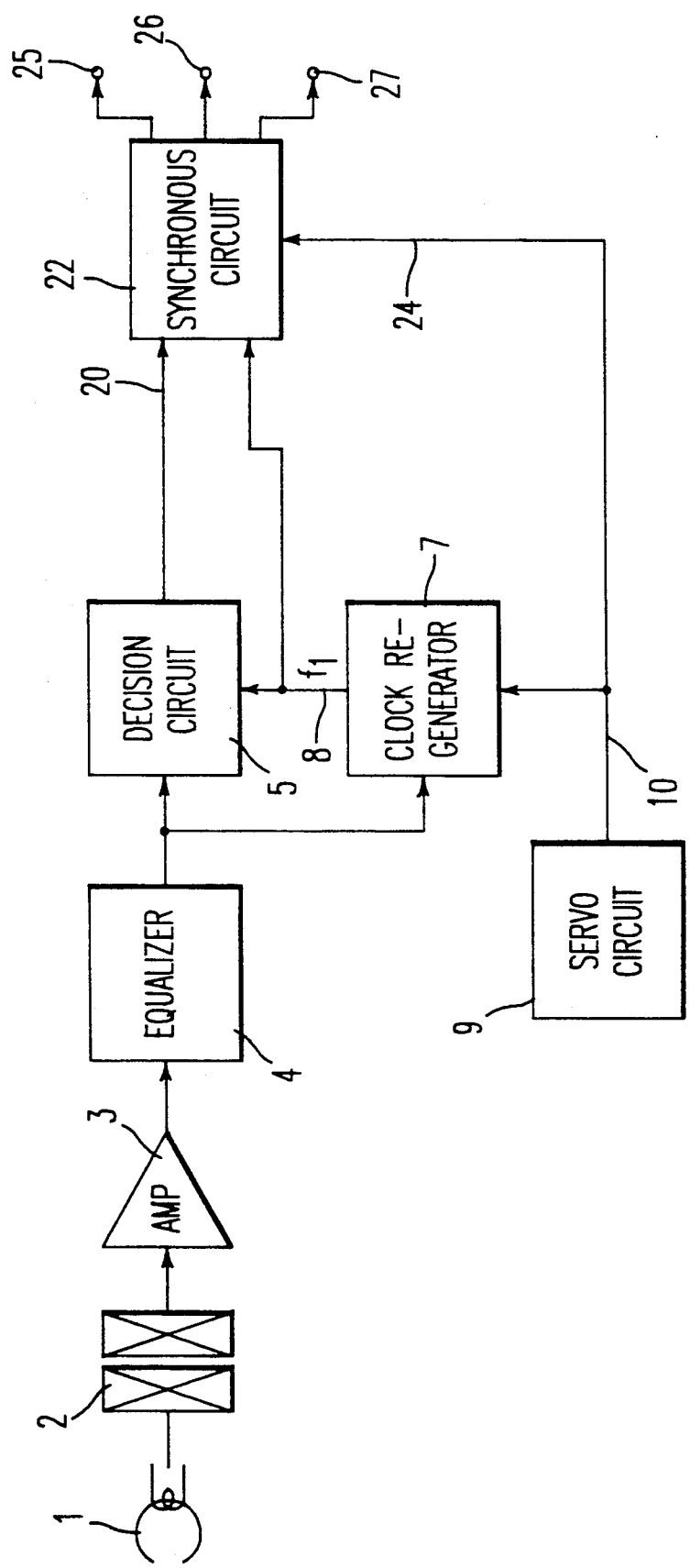
FIG. 9 is a block diagram of a prior art apparatus.

The synchronous operation (not including the audio data and bit clock) of this synchronous detector 22, such as shown in FIG. 8 in detail, will now be explained. This circuit includes a synchronous word detector 200, a logic circuit 201, a counter A 202, B 205, a window generator 207, a decode circuit 206, a shift register 208, and a gate circuit 203, 204. The synchronous word detector 200 has a function of detecting synchronous words, and a window for detecting synchronous words is generated by window generator 207. The counter B 205 generates an address at an input reset timing. Decode circuit 206 decodes the address and the shift register 208 generates a reset pulse. The logic circuit 201 is reset a predetermined amount by the counter A 202.

(A) "First condition where the second reproduced data 20 is not input."

On this condition, a logic circuit 201 is reset by input of timing signal 209 from a gate circuit 204, and this signal 209 is generated by the input of second audio gate signal 24. Simultaneously a counter A 202 is reset by a reset signal 210 from the logic circuit 201. This condition is called "S0".

(B) "Second condition where the second reproduced data 20 is input."

On this condition, a synchronous word detector 200 detects the synchronous word included in the second reproduced data 20.

(1) The detected signal 211 from the synchronous word detector 200 is input the logic circuit 201 and signal 212 from this logical circuit 201 is input a gate 203.

(2) A counter B 205 is reset by a signal from gate 203. This condition is called "S1". An interval between each synchronous word is counted by a loop comprised of the counter 205, a decode circuit 206 and the gate 203. A window generator 207 forecasts the timing of the next synchronous word with an address data 214 from the counter B 205, and generates a window signal 213.

In case a synchronous word is detected within this window signal 213, the counter B 205 is reset and a shift register 208 is cleared by the signal from the logic circuit 201. Also, a signal 210 from the logic circuit 201 resets signal 210 of the counter A 202. This condition is called "S2".

On the other hand, in case of non-detection of a synchronous word within the window signal 213, the counter B 205 is not reset and the shift register 208 is not cleared. As a result, the output signal from the decode circuit 206 is input the shift register 208 and the logic circuit 201 is reset by the signal 216 from this shift register 208. Namely, it is returned to the condition of "S0".

(3) EN1 of the counter A 202 is an enable signal, and on the condition "S2", EN1 of the counter A 202 is active. On the condition of "S2", in case of detection of a synchronous word within the window signal 213, the counter B 205 is reset and the shift register 208 is cleared by signal 212, and the counter A 202 is reset by signal 210. Namely, it is still in the condition of "S2".

On the other hand, in case of non-detection of a synchronous word within the window signal 213, the counter B 205 is not reset and the shift register 208 is not cleared. Also the counter A 202 is not reset and the counter A 202 is counted-up by signal 215 input in EN2 (enable). Then, when the counted-up value of the counter A 202 is less than a predetermined value, it is still on the condition of "S2". When the value is more than the predetermined value, the logic circuit 201 is reset by signal 209 via the gate 204 from counter A 202 and the counter A 202 is reset by signal 210 from the logic circuit 201. Namely, it is returned to the condition of "S0". The above described circuits correspond to the synchronous detector 22 is FIG. 1.

The bit rate of the second reproduced data 20, which is input to the synchronous detector 22, is $f_2$ (bps), which is lower than the bit rate $f_1$ (bps) of the first reproduced data 6. Namely, if $f_2$ is selected to be under about 12.15 MHz, for example, a CMOS IC is used as a synchronous detector 22. It is most important to predetermine a rate of expansion such as to maintain the time to correct errors.

As described with reference to the embodiment, the digital audio signals are recorded on a part of the tracks and the video signals are recorded on an other part of the tracks. The period when the rotary magnetic head is reproducing the video signals can be obtained in addition to moving between the tracks to reproduce the digital audio signals. The rate of time base expansion can be determined considering this period (dependent on the format of magnetic tape) and a process time for error correction.

Consequently, by using effectively this period, the synchronous word included into the second reproduced data of low bit rate $f_2$ (bps) can be detected more slowly.

As explained, the second audio gate signals which show the existing period of the second reproduced data 20 may be generated from the read out address of the memory 14. In addition, we may use a RAM (Random Access Memory) as the memory 14, instead of the above FIFO.

This invention can be modified in various manners without departing from the scope of the invention.

What is claimed is:

1. A data reproducing apparatus for generating digital signals corresponding to data recorded on a recording medium, the data including synchronous words for establishing synchronization, each synchronous word corresponding to a predetermined arrangement of a portion of the data, comprising:

means for detecting the recorded data from the medium and for generating digital data signals, corresponding to the recorded data and including the synchronous words, having a first predetermined bit rate;

expansion means for converting the digital data signals, including the synchronous words, from the detecting means into expanded digital signals and for providing the expanded digital signals, including the synchronous words, with a second bit rate less than the first bit rate; and synchronous detector means, coupled to the expansion means, for extracting the portions of the expanded digital signals corresponding to the synchronous words included therewith;

wherein the digital data signals, including the synchronous words of the recorded data, are expanded before being supplied to the synchronous detector means.

2. The apparatus of claim 1 wherein the data also includes audio data and error correction words and the digital signals include audio signals, and the apparatus also includes error correction means for modifying the audio signals in response to the error correction words.

3. The apparatus according to claim 1, wherein the second bit rate is less than or equal to 12.15 MHz.

4. A data reproducing apparatus for generating digital signals corresponding to data recorded on a recording medium, the data including synchronous words for establishing synchronization, each synchronous word corresponding to a predetermined arrangement of a portion of the data, comprising:

means for generating serial digital signals, including the synchronous words, corresponding to the recorded data on the medium;

means for converting the serial digital data signals to parallel digital signals including the synchronous words;

means for temporarily storing the parallel data corresponding to the parallel digital signals at a first speed;

means for reading the stored parallel data and for regenerating the parallel digital signals at a second speed less than the first speed;

means for reconverting the regenerated parallel digital signals to serial digital signals including the synchronous words; and synchronous detector means for extracting the portions of the serial digital signals corresponding to the synchronous words;

wherein the digital data signals, including the synchronous words of the recorded data, are reconverted before being supplied to the synchronous detector means.

5. The apparatus of claim 4 wherein the converting means includes an n-step shift register and an n-bit latch circuit.

6. The apparatus of claim 4 wherein the reconverting means includes an n-step shift register.

7. The apparatus according to claim 4, wherein the second speed is less than or equal to 12.15 Mhz.

* * * * *